Dec. 10, 1929.  R. L. HINMAN  1,739,483
TEAT CUP
Filed Oct. 17, 1927
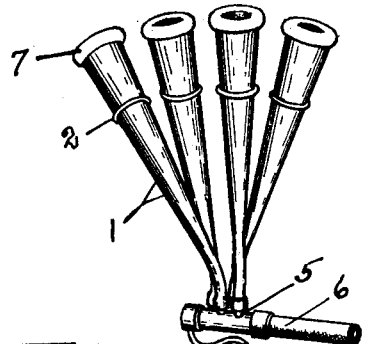
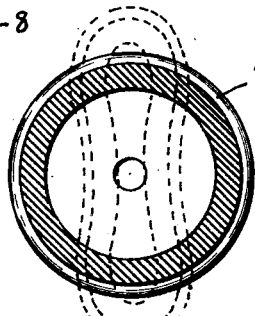
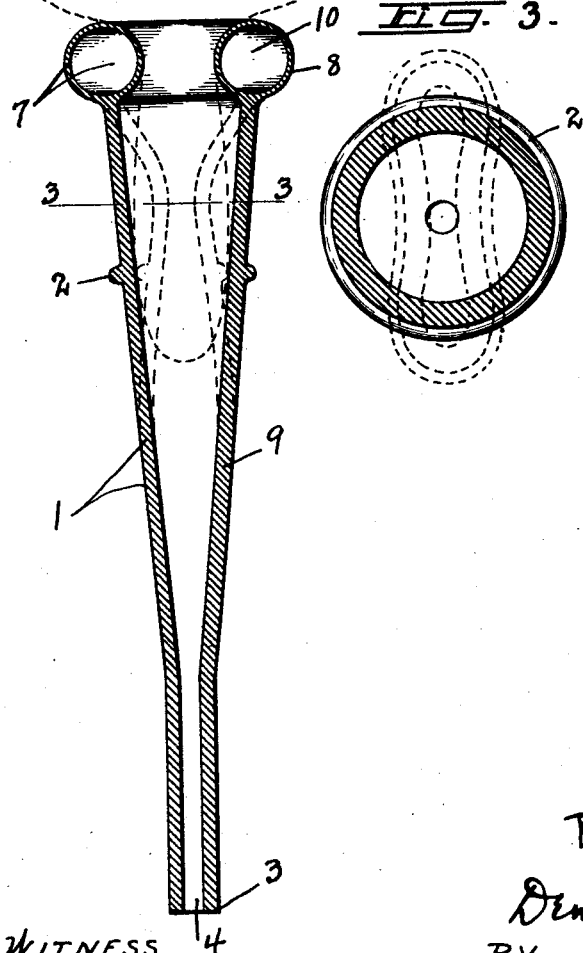
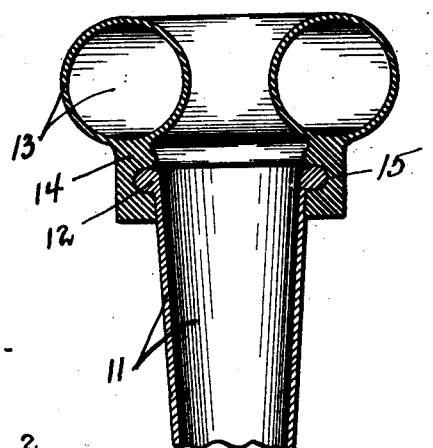
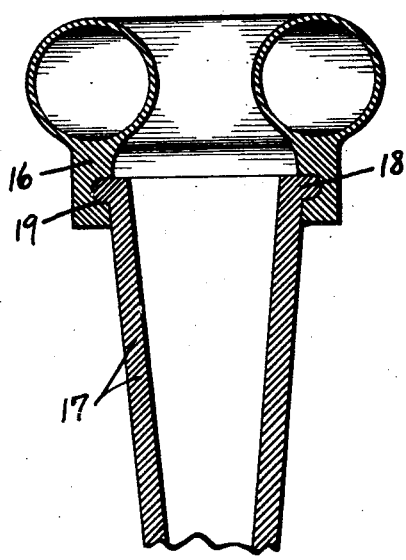
R. L. Hinman
INVENTOR
Denison & Thompson
BY
ATTORNEYS.

Patented Dec. 10, 1929

1,739,483

UNITED STATES PATENT OFFICE

RALPH L. HINMAN, OF ONEIDA, NEW YORK, ASSIGNOR TO HINMAN MILKING MACHINE COMPANY, OF ONEIDA, NEW YORK, A CORPORATION OF NEW YORK

TEAT CUP

Application filed October 17, 1927. Serial No. 226,707.

This invention relates to a new and improved teat cup for milking machines.

In the case of all teat cups known to the art the end of the cup is solid and has a flat edge, with the result that it is not easily adapted to all sizes of teats and with the further disadvantage that the sharp edge is liable to chafe the udder of the cow.

The main object of my invention is to provide a teat cup which will adapt itself to all sizes of teats and which will cause no discomfort to the cow.

Another object is to provide a teat cup which will retain its effective shape and contour for a longer period than the teat cups now known to the art.

Other objects and advantages relate to the size, shape and arrangement of parts, all as will more fully appear from the following description, taken in connection with the accompanying drawings, in which:—

Figure 1 is a perspective view of four of my teat cups in position on the suction line of a milking machine.

Figure 2 is a vertical cross-section through one of my teat cups.

Figure 3 is a section on line 3—3, Figure 2.

Figure 4 is a vertical section of a modified form of my device.

Figure 5 is a vertical section of another modification of my device.

My device consists of a tapered tubular body —1— preferably made of rubber and having an external circular bead —2— so positioned that it will encircle the teat of the cow near the end thereof when the teat is in position in the cup.

The bottom end —3— of body —1— has an opening —4— of a proper size to fit over a nozzle —5— on the suction line —6— of a milking machine (not shown). The top end of body —1— carries a hollow annular portion —7— having an opening therethrough which is less in diameter than the inside diameter of the adjacent portion of body —1—. The thickness of wall —8— of portion —7— is preferably less than the thickness of the wall —9— of body —1—. The thickness of wall —8— may be $\frac{1}{16}$th of an inch and the diameter of the air space —10— may be $\frac{7}{8}$ths of an inch, and the thickness of wall —9— may be $\frac{3}{16}$ths of an inch. These measurements are, however, susceptible of wide variation, the essential feature of my invention being a hollow, flexible end for a teat cup which will conform easily to a teat of the cow without danger of injury to the teat or the udder.

Certain milking machines are constructed in a way which requires the use of removable ends for the teat cups, and in Figures 4 and 5 I have shown variations of my invention designed for use in cases where the ends of the teat cups are removable. In Figure 4 my device is shown in position on a metal cup body —11— which carries on the end an external annular bead —12—.

For use with body —11— I form my device with a hollow annular portion —13— similar to portion —7— shown in Figure 2 and with an annular depending flange —14— adapted to fit over the end of body —11— and being provided with an internal annular recess —15— to receive bead —12— and lock the device in position.

Figure 5 shows a device similar to the device shown in Figure 4 with a modification in the shape of the depending flange —16— which adapts it for use with a different type of body as —17— made of a flexible material, as rubber. Body —17— also carries at the end an external annular bead —18— which is positioned in an internal annular groove —19— in flange —16—.

It will be understood that the main feature of my invention consists of the hollow, annular ring shown as —7— in Figure 2, and as —13— in Figure 4, and that different methods of attaching the same to a teat cup body may be adopted without departing from the spirit of my invention, for altho I have shown and described a specific structure and form of part as illustrative of an embodiment of my invention, I do not desire to restrict myself to the exact shape, form or arrangement of parts, as various changes may be made within the scope of the appended claim.

I claim:

In a device of the class described, a cylindrical body having an integral flexible tubular annular flange at one end, the interior diameter of the annular flange being less than the interior diameter of the adjacent portion of the cylindrical body.

In witness whereof I have hereunto set my hand this 13 day of October, 1927.

RALPH L. HINMAN.